US012585713B1

(12) United States Patent
Thomas et al.

(10) Patent No.: US 12,585,713 B1
(45) Date of Patent: Mar. 24, 2026

(54) SYSTEMS AND METHODS FOR DATA SCRAPING ENCRYPTED CONTENT SOURCES COMPRISING MULTI-LAYERED ENCRYPTIONS AND NESTED CONTENT

(71) Applicant: Dark Watch, Stuart, FL (US)

(72) Inventors: Noel Thomas, Stuart, FL (US); James Snay, Stuart, FL (US)

(73) Assignee: Dark Watch, Stuart, FL (US)

( * ) Notice: Subject to any disclaimer, the term of this patent is extended or adjusted under 35 U.S.C. 154(b) by 0 days.

(21) Appl. No.: 19/009,884

(22) Filed: Jan. 3, 2025

(51) Int. Cl.
*G06F 16/95* (2019.01)
*G06F 16/951* (2019.01)
*H04L 9/40* (2022.01)

(52) U.S. Cl.
CPC ............ *G06F 16/951* (2019.01); *H04L 63/08* (2013.01); *H04L 2463/041* (2013.01)

(58) Field of Classification Search
CPC .................................................... G06F 16/951
USPC ........................................................ 707/770
See application file for complete search history.

(56) References Cited

U.S. PATENT DOCUMENTS

| | | | | |
|---|---|---|---|---|
| 11,119,990 | B1 * | 9/2021 | Chhawacharia | ...... G06F 16/211 |
| 2012/0047179 | A1 * | 2/2012 | Faruquie | ............ G06F 16/9027 |
| | | | | 707/802 |
| 2023/0376581 | A1 * | 11/2023 | Shear | ...................... G06F 21/86 |
| 2024/0388443 | A1 * | 11/2024 | Zemla | ................... H04L 9/0891 |

FOREIGN PATENT DOCUMENTS

| | | | | | |
|---|---|---|---|---|---|
| CN | 101854342 | A | * | 10/2010 | |
| CN | 108886518 | A | * | 11/2018 | ........... H04L 67/141 |
| CN | 111226429 | A | * | 6/2020 | ............. H04L 67/02 |
| CN | 119631067 | A | * | 3/2025 | ......... G06F 16/9027 |
| ES | 2786254 | T3 | * | 10/2020 | .......... G06K 7/1417 |
| GB | 2541040 | A | * | 2/2017 | ............... H04L 9/32 |

* cited by examiner

*Primary Examiner* — Syling Yen
(74) *Attorney, Agent, or Firm* — Foley & Lardner LLP

(57) ABSTRACT

Systems and methods for uses and/or improvements to data scraping and/or data collection applications. As one example, systems and methods for web scraping applications that overcome multi-layered encryptions, content nesting, and/or other techniques for frustrating web scraping systems. For example, some websites, particularly those used in human trafficking, fraud, and/or other criminal enterprises, employ various encryption and/or encoding techniques to obstruct and frustrate web scraping systems, aiming to hide their data.

20 Claims, 7 Drawing Sheets

160

Details

| | |
|---|---|
| Source: | DW Dataset |
| | Risk Score: | 92% |
| Place name: | Rainbow Star Acupressure Center |
| | Tag: | Asian massge |
| Short description: | Acupressure center offering traditional Asian massage services, located in Escondido, CA. Location has been flagged for concerns related to illicit activities, including potential human trafficking under investigation. |
| Address: | 387 N Escondido Blvd Escondido, CA, 92025 |
| | Status: | Open |
| Street: | Escondido Blvd |
| | Phone: | 760-839-6666 |
| City: | Escondido |
| | State: | CA |
| Zip: | 92025 |
| | Rate: | 80 |
| Longitude: | -117.086468002334 |
| | Latitude: | 33.1226599992949004 |
| Reviews: | NA |

Figure 2:
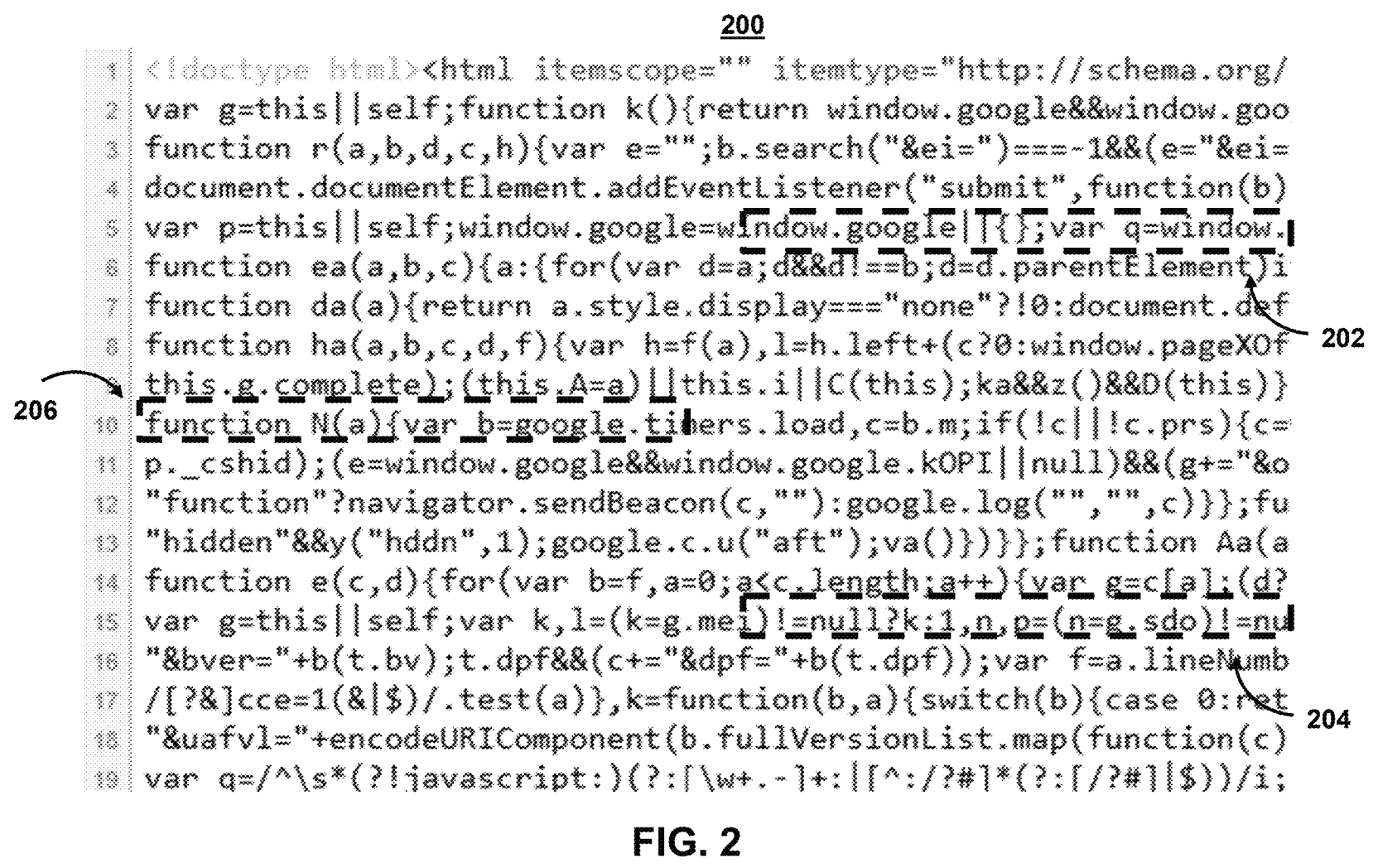

```
1  <!doctype html><html itemscope="" itemtype="http://schema.org/
2  var g=this||self;function k(){function r(a,b,d,c,h){return window.google&&window.goo
3  function r(a,b,d,c,h){var e="";b.search("&ei=")===-1&&(e="&ei==
4  document.documentElement.addEventListener("submit",function(b)
5  var p=this||self;window.google=window.google||{};var q=window.
6  function ea(a,b,c){a:{for(var d=a;d&&1!=b;d=d.parentElement)i
7  function da(a){return a.style.display=="none"?!0:document.df
8  function ha(a,b,c,d,f){var h=f(a),l=h.left+(c?0:window.pageXOf
9  this.g.complete};(this.A=a)||this.i||c(this);ka&&z()&&D(this))
10 function N(a){var b=google.tilers.load,c=b.m;if(!c||!c.prs){c==
11 p._cshid);(e=window.google&&window.google.kOPI||null)&&(g+="&o
12 "function"?navigator.sendBeacon(c,""):google.log("","",c));fu
13 "hidden"&&y("hddn",1);google.c.u("aft");va()}}};function Aa(a
14 function e(c,d){for(var b=f,a=0;a<c.length;a++){var e=c[a],d?
15 var g=this||self;var k,l=(k=g.me1)!=null?k:1,n,o=(n=g.sdo)!=nul
16 "&bver="+b(t.bv);t.dpf&&(c+="&dpf="+b(t.dpf);var f=a.lineNumb
17 /(?&]cce=1(&!$)/.test(a)),k=function(b,a){switch(b){case 0:ret
18 "&uafvl="+encodeURIComponent(b.fullVersionList.map(function(c)
19 var q=/^\s*(?!javascript:)(?:[\w+.-]+:|[^:/?#]*(?:[/?#]|$))/i;
```

300
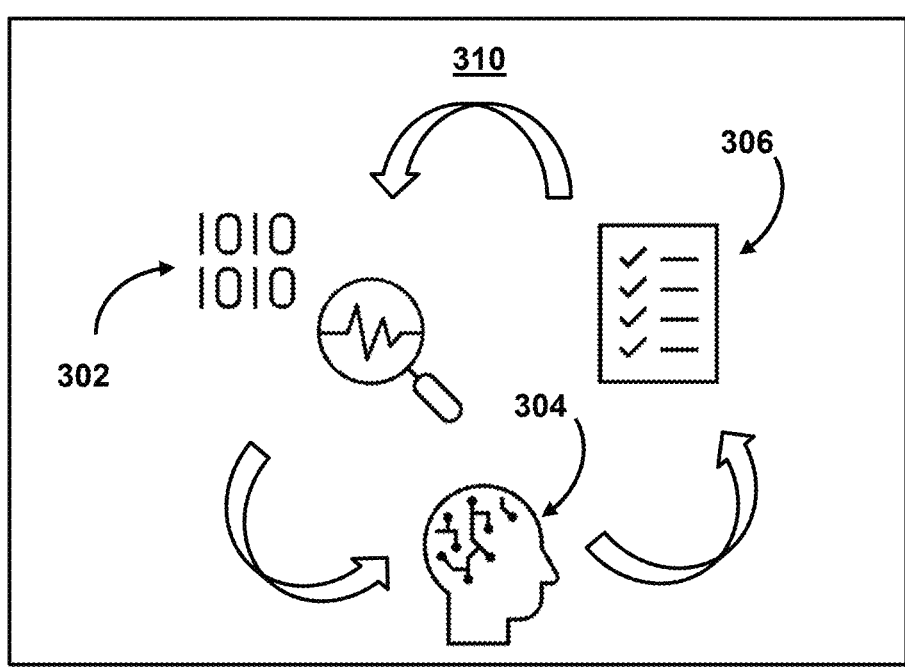
310
306
302
304
330
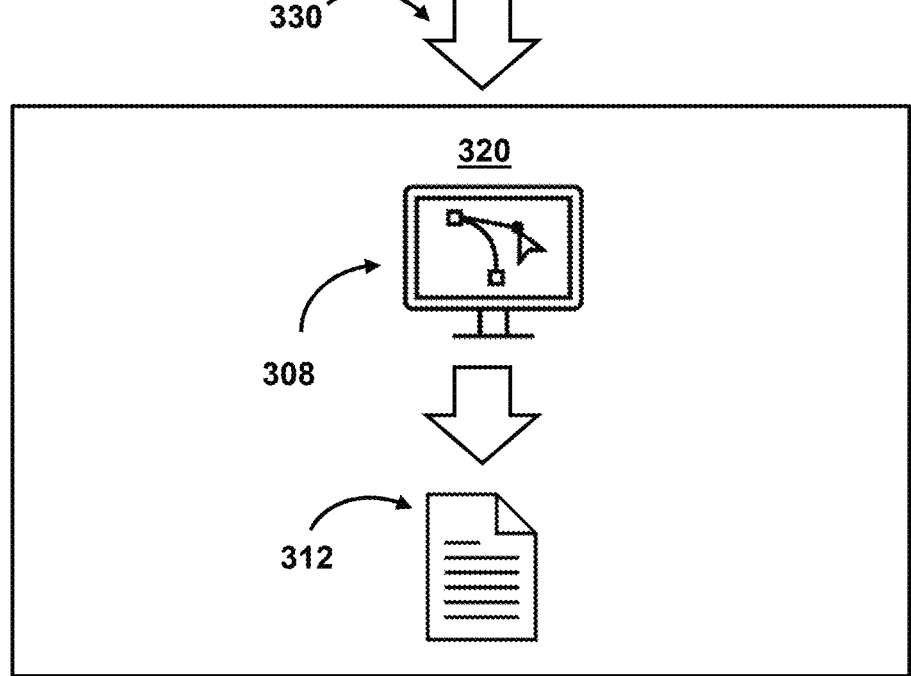
320
308
312
FIG. 3

400

Retrieve a content source

402

Determine a data encryption type

404

Select an extraction function based on the data encryption type

406

Generate non-encrypted content based on the extraction function

408

Display the encrypted content

410

SYSTEMS AND METHODS FOR DATA SCRAPING ENCRYPTED CONTENT SOURCES COMPRISING MULTI-LAYERED ENCRYPTIONS AND NESTED CONTENT

BACKGROUND

Web scraping is the process of automatically extracting information from websites using software tools or scripts. It involves sending a request to a web page, retrieving its content—typically in HTML or another structured format—and then parsing the data to extract specific information, such as text, images, or other elements. Web scraping is highly beneficial because it allows organizations, researchers, and businesses to gather and analyze large amounts of publicly available data efficiently. However, some websites, particularly those facilitating illicit activities such as human trafficking, fraud, or other criminal enterprises, actively resist data collection to avoid scrutiny and detection using data encryptions. These websites may fear exposure, as scraping could allow law enforcement agencies, activists, or researchers to uncover illegal activities, identify patterns, and trace individuals involved. By frustrating scraping efforts, such websites attempt to maintain anonymity and reduce the risk of being held accountable.

Data encryption is the process of transforming data into a secure format that prevents unauthorized access or understanding. This may comprise converting it into ciphertext using cryptographic algorithms such that only authorized users with the correct decryption key can access the original data. Alternatively or additionally, this may include data obfuscation techniques, such as masking, which involves partially or completely replacing sensitive data with altered or dummy values while retaining its structure and usability for specific purposes.

SUMMARY

Systems and methods are described herein for novel uses and/or improvements to data scraping and/or data collection applications. As one example, systems and methods are described herein for data scraping applications that overcome multi-layered encryptions, content nesting, and/or other techniques for frustrating web scraping systems. For example, some websites, particularly those used in human trafficking, fraud, and/or other criminal enterprises, employ various encryption and/or encoding techniques to obstruct and frustrate web scraping systems, aiming to hide their data.

These websites may use sophisticated tools or techniques to make scraping data more complex and/or impossible. For example, websites may use mechanisms such as CAPTCHAS, which challenge automated bots with puzzles that are easy for humans but difficult for machines to solve. Additionally, as web scraping is often a time-dependent process, websites may monitor the frequency and pattern of requests, blocking IP addresses that exhibit suspicious behavior indicative of bots, such as sending too many requests in a short time. These websites may also use dynamic content loading, where key data is only rendered in the browser after specific actions, making it harder to scrape in one pass. As another example, websites may implement anti-scraping headers and token-based authentication systems, requiring valid session tokens for accessing content, the expiration of which may prevent a thorough review of the website and/or allow for scraping of dynamic and time-based content. Finally, websites may use data obfuscation, such as encoding or encrypting content, and serve different versions of the website to users and suspected bots.

Each of these measures adds to the complexity and additional time pressure to web scraping. For example, even if content can be successfully detected and decrypted, the detection and decryption themselves create time pressures for successfully scraping the data. Moreover, in many instances, these techniques may be embedded within each other such that one encryption used to frustrate web scraping may be nested inside another. Thus, even if one mechanism is overcome, additional mechanisms may still prevent the data collection.

To overcome these technical hurdles in data scraping and/or data collection, the systems and methods use a bifurcated data extraction routine that includes an initial analysis and tagging routine prior to a dynamically selected extraction routine. More specifically, the first routine of the bifurcated scrapping routine may parse websites (or other content) and tag relevant data to map the website. Once the website is mapped, the system may determine, based on characteristics of the relevant data, one or more functions (and an order of execution) for extracting the relevant data. By first generating the map of relevant data, the system may determine what data to scrape, what function to use to successfully scrape the data, and how to do so both efficiently and precisely.

In some aspects, systems and methods for data scraping encrypted content sources comprising multi-layered encryptions and nested content are described. For example, the system may retrieve a first content source, wherein the first content source comprises a plurality of encrypted content masked by one or more of a plurality of data encryption types. The system may execute a first routine, of a bifurcated data extraction routine, on the first content source to determine a first data encryption type for first encrypted content in the first content source. The system may execute a second routine, of the bifurcated data extraction routine, to select a first extraction function, from a plurality of extraction functions, based on the first data encryption type. The system may generate first non-encrypted content based on applying the first extraction function to the first encrypted content. The system may generate for display, on a user interface, the first non-encrypted content.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIGS. 1A-D show an illustrative diagram for a user interface accessing a secured session and accessing secured data, in accordance with one or more embodiments.

FIG. 2 shows an illustrative diagram showing the parsing of data elements, in accordance with one or more embodiments.

FIG. 3 shows illustrative components for a system used to perform a bifurcated data extraction routine, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
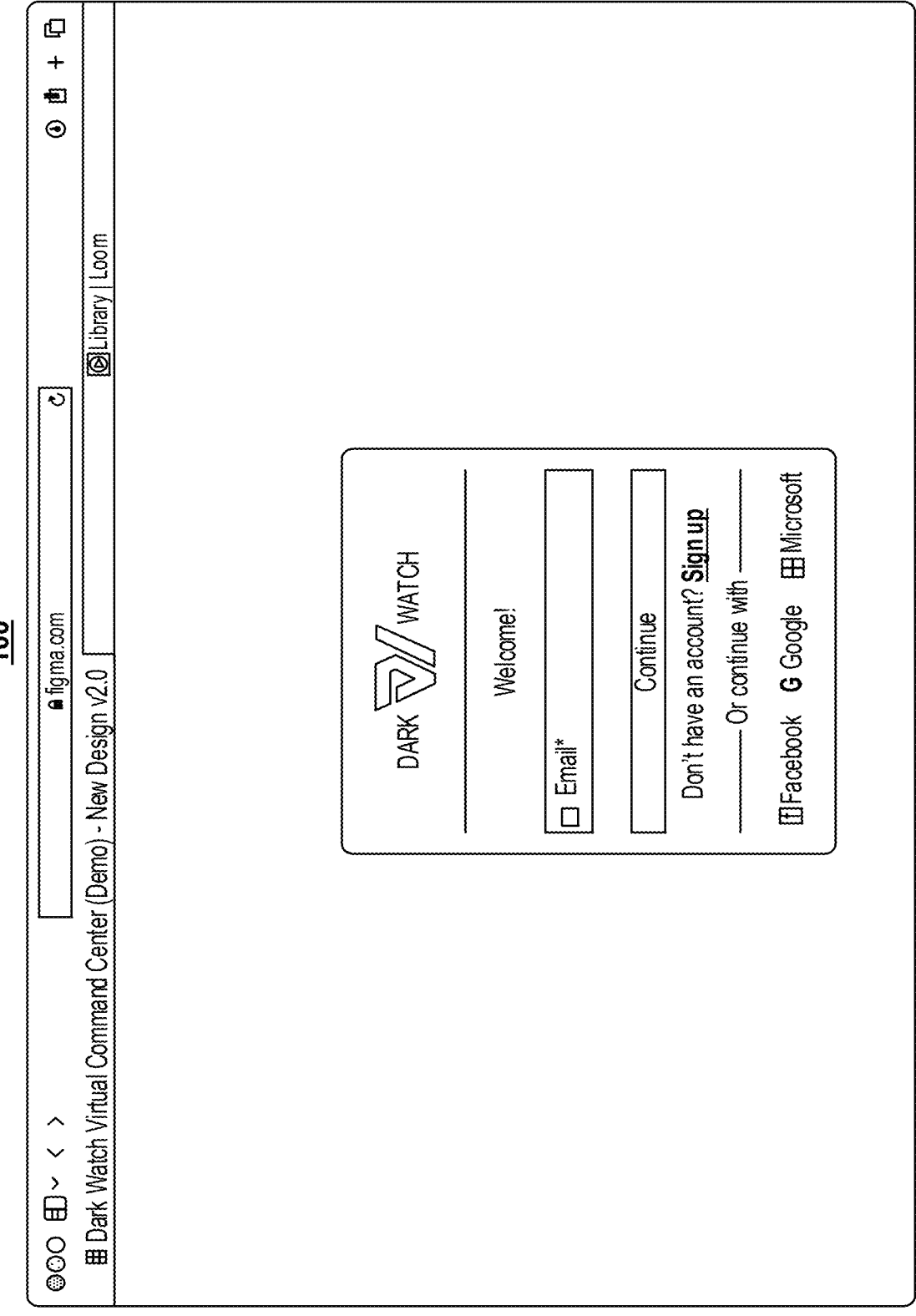

FIGS. 1A-D show an illustrative diagram for a user interface accessing a secured session and accessing secured data, in accordance with one or more embodiments. For example, FIG. 1A illustrates a user interface (e.g., user interface 100) designed as a portal for accessing a system that facilitates specific functions. A user interface (UI) is a graphical or interactive component of a software application that enables users to communicate with a system. It typically includes visual elements such as menus, buttons, text fields, and dashboards, as well as input mechanisms like keyboards, mice, touchscreens, or voice commands. Users access and interact with the UI through devices such as computers, smartphones, or tablets, using these input methods to navigate the interface, execute commands, and retrieve information.

In the context of FIG. 1A, the system described is a proprietary scraping and data aggregation tool that operates by combing illicit data from the web. The tool aggregates this information into a centralized data lake, organizing it for efficient retrieval and integration. The user interface simplifies the process of importing this data into native systems or core platforms used for account and transaction monitoring. By presenting the scraped and aggregated data in an accessible format, the UI facilitates streamlined workflows, allowing users to identify, analyze, and act on suspicious or relevant information effectively within their monitoring systems.

In some embodiments, the data scraping and collection tool can be adapted to extract information from a variety of data sources beyond the Internet, including structured databases, unstructured file systems, and proprietary platforms. To scrape other databases, the tool can be configured to connect directly to database systems via APIs, SQL queries, or other integration methods, depending on the database architecture. For relational databases, the tool might utilize structured query language (SQL) to retrieve data from tables based on defined criteria. In the case of NoSQL databases, it can leverage their specific query mechanisms, such as aggregation frameworks or search queries, to extract relevant information.

For proprietary or closed systems, the tool may employ automated processes like screen scraping, direct API integrations, or data exports facilitated by the host system. Additionally, it can work with file-based storage systems, parsing data from formats such as CSV, XML, JSON, or log files. In these contexts, the tool's adaptability lies in its ability to interface with multiple protocols, transform raw data into a structured format, and aggregate the results into its centralized data lake. This flexibility makes it a versatile solution for collecting and consolidating information from disparate sources, supporting robust data analysis and integration into core systems.

As described herein, systems and methods may relate to data scraping applications that overcome multi-layered encryptions, content nesting, and/or other techniques for frustrating data scraping systems. As referred to in, encrypted content and/or obfuscated content (which may be referred to collectively) may refer to any content that is not collectable or able to be processed in its native form. For example, encrypted content and/or obfuscated content may refer to content in which its native form is prevented from collection based on key encryptions, content nesting, and/or other techniques used to frustrate data collection and/or processing systems. It should also be noted that as described herein, embodiments describing "encrypted content" may be referred to interchangeably with "obstructed content." That is, the systems and methods described herein may be applied to collect data despite the one or more mechanisms used to prevent that collection.

As shown in FIG. 1A, user interface 100 may be used by the system to receive a first user request to begin a secured session. The system may then authenticate the secured session. In response to authenticating the secured session, the system may retrieve a first content source (e.g., a website, a database, etc.). For example, a user interface (e.g., user interface 100) may serve as the interactive gateway through which a user initiates and manages a secured session within the system. To begin, the user interacts with the interface by submitting a request to access a secured session, typically through login credentials, such as a username and password, or other authentication mechanisms, such as biometric verification or multi-factor authentication. Upon receiving this first user request, the system processes the authentication by verifying the provided credentials or security tokens against its access control mechanisms.

Once the secured session is authenticated, the system uses the user interface to notify the user of successful access and provide navigation options. Concurrently, the system retrieves the first content source, such as a website or a database, as specified in the session request or default configurations. The user interface then presents the retrieved content or tools for interacting with it, allowing the user to perform tasks like data scraping, content analysis, or integration into other systems. By mediating these actions, the user interface ensures secure and seamless interaction between the user and the system's core functionalities.

As described herein, a secured session may be a protected communication period between a user and a system, during which data is exchanged under strict security protocols to prevent unauthorized access, tampering, or interception. Its characteristics may include authentication, encryption, session management, and activity monitoring. Authentication ensures that only authorized users can initiate the session, typically through credentials, biometrics, or multi-factor authentication. Encryption secures the data transmitted during the session, making it unreadable to anyone intercepting the communication. Common encryption protocols, such as SSL/TLS, are used to protect sensitive information exchanged over networks.

Session management may involve assigning a unique session identifier to track and maintain the user's interaction with the system securely. These identifiers, often stored in cookies or session tokens, help ensure continuity and prevent session hijacking. Additionally, secured sessions are characterized by strict timeout rules, which automatically terminate the session after a period of inactivity to reduce vulnerability. Activity monitoring may also be employed to detect and respond to suspicious behaviors during the session. By combining these features, a secured session safeguards the confidentiality, integrity, and availability of the data and system resources involved.

Figure 1B:
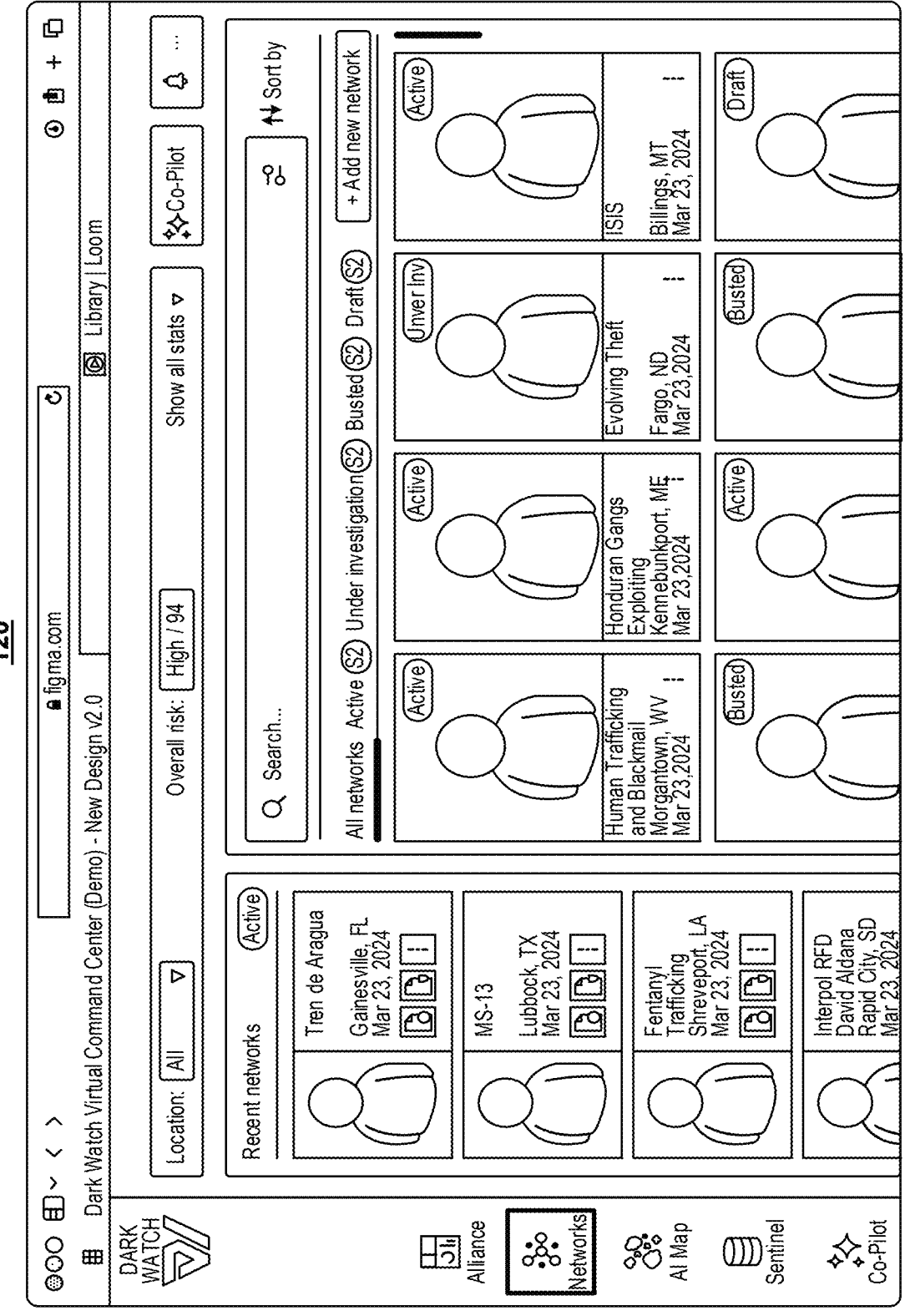

For example, FIG. 1B illustrates a user interface (e.g., user interface 120), which may show data aggregated from one or more data sources. For example, as shown in user interface 120, the system may aggregate information to generate user profiles based on data scraping, collecting, and/or monitoring. For example, data sources may comprise any origin and/or repository of information that can be accessed, extracted, and used for various purposes such as analysis, reporting, decision-making, or integration into other systems. These sources can take many forms, including structured databases, unstructured text files, web pages, application programming interfaces (APIs), logs, or real-time data streams. They can exist within local systems, cloud environments, or external platforms. Structured data sources, like relational databases, store information in organized tables with predefined schemas, making it easier to query and retrieve specific data. In contrast, unstructured data sources, such as emails, social media content, or multimedia files, require additional processing to extract useful insights. Data sources can also vary by accessibility and ownership, ranging from publicly available resources, such as government open data and publicly indexed web pages, to private and secured sources, such as enterprise databases or proprietary systems. Regardless of their format or location, data sources serve as the foundation for building analytical models, automating processes, and supporting operational or strategic objectives. Access to data sources often requires tools, protocols, or permissions to ensure proper integration and compliance with security and privacy standards.

As described herein, data may be a collection of raw facts, figures, or measurements that represent information about objects, events, or concepts. It serves as the foundational element for analysis, decision-making, and communication. Data can take various forms, including numerical values, textual descriptions, images, audio, or video. It can be structured, organized in a specific format like rows and columns in a database; semi-structured, such as JSON or XML files with tags but no strict schema; or unstructured, such as free-form text, social media posts, or multimedia content. The type of information included in data depends on its source and purpose. For example, transactional data may include timestamps, customer IDs, product details, and payment amounts. Demographic data could contain information such as age, gender, location, and income level. Scientific data might capture temperature readings, chemical compositions, or experimental results. Other examples include metadata, which provides information about other data (e.g., file creation date), and behavioral data, which tracks user interactions, clicks, or activity patterns. Regardless of its type, data is a critical resource for extracting insights, identifying trends, and enabling informed decisions.

Data may be aggregated into user profiles by collecting and combining various pieces of information from multiple sources to create a comprehensive representation of an individual's behaviors, preferences, and attributes. This process begins with data acquisition, where relevant information—such as demographic details, transaction history, online activity, social media interactions, and location data—is gathered. These data points are then cleaned, nor-malized, and structured to ensure consistency and accuracy. The aggregated data may be analyzed to identify patterns and relationships, enabling the creation of a detailed profile. For instance, purchase history and browsing behavior can indicate preferences, while location data might reveal routines or frequently visited places. This information is typically categorized into attributes such as interests, habits, demographics, and predicted needs. Advanced techniques, such as machine learning algorithms, can further enrich profiles by deriving insights like predictive behaviors or segmenting users into groups based on similarities.

User profiles may be used to identify known traffickers and individuals or entities involved in illicit activities by aggregating and analyzing data that reveals patterns, connections, and behaviors indicative of illegal operations. By compiling information from various sources-such as online activity, financial transactions, social media interactions, communication records, and public databases-profiles can highlight suspicious behavior or unusual patterns that align with known indicators of trafficking or other illicit activities. For instance, frequent transactions across multiple accounts, inconsistent travel patterns, or communications with flagged individuals can signal potential involvement in unlawful activities.

Advanced analytics tools and machine learning algorithms can enhance these profiles by identifying correlations, trends, and anomalies that may not be immediately apparent. For example, network analysis can reveal relationships between entities, exposing hidden connections within trafficking networks. Behavioral profiling can flag activities such as unusual spending, frequent use of anonymizing tools, or participation in dark web marketplaces. Additionally, integrating external intelligence, such as law enforcement data or watchlists, can further refine profiles to match against known offenders or high-risk entities. These user profiles serve as critical tools for law enforcement, financial institutions, and regulatory bodies, enabling targeted investigations and proactive measures to disrupt criminal networks.

Figure 1C:
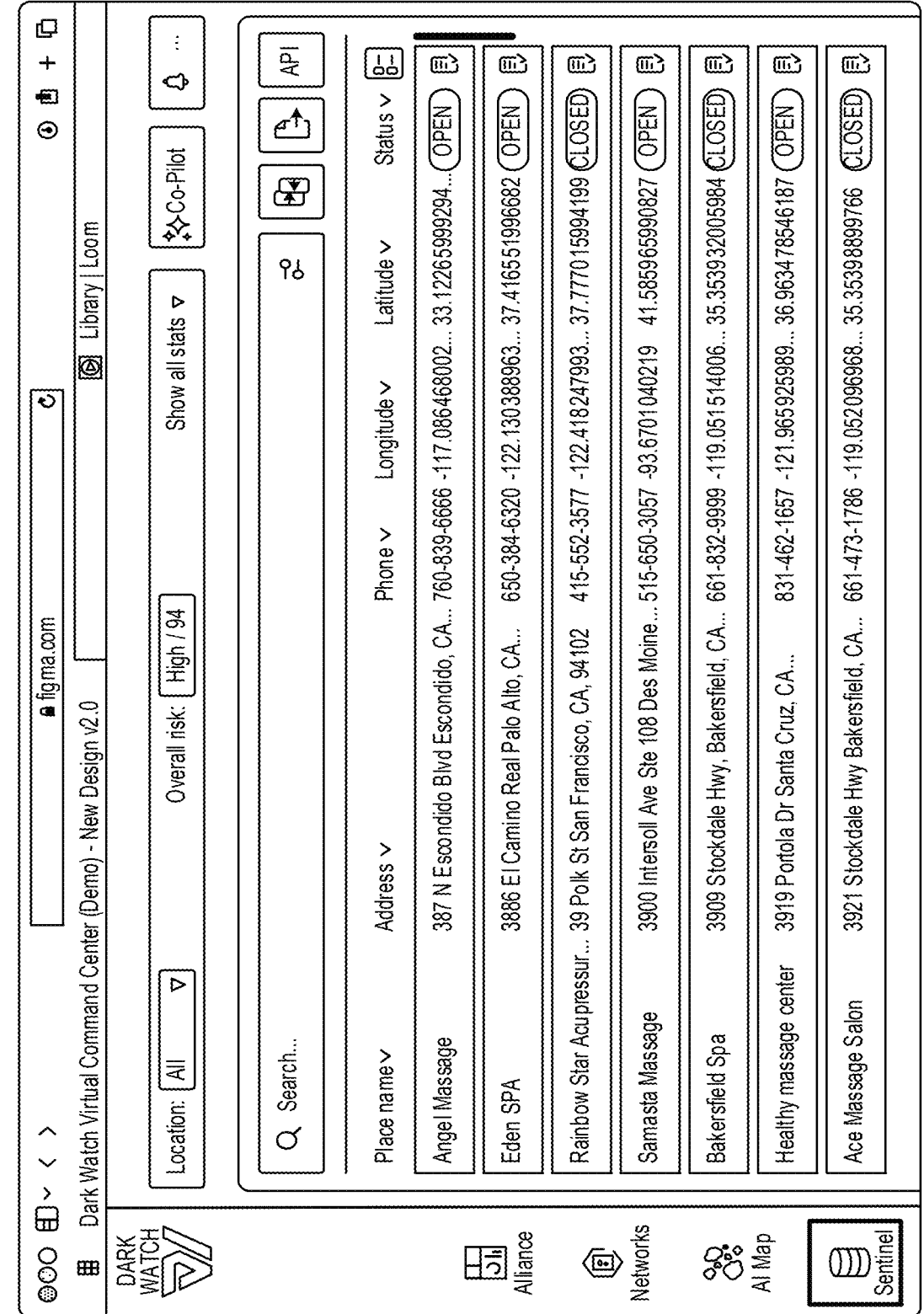

As shown in FIG. 1C, user interface 140 may display aggregated data that is organized into a structured form. For example, the system may display aggregated data organized into a structured form that enables users to gain meaningful insights by presenting information in an accessible and interactive format, often through dashboards, tables, or visualizations. For example, when working with financial institutions, the system may ingest raw data from their account and transaction monitoring systems, including transaction details, customer profiles, and flagged activities. The system may then perform advanced data processing to cross-check this information against external data sources, such as business records, email logs, phone directories, or e-transaction handles. By aggregating these datasets, the system creates a detailed and interconnected view of entities involved in financial activities.

By doing so, unlike traditional watchlist systems with high false-positive rates, the system may apply correlation algorithms to identify meaningful patterns and relationships between entities. As one example, the system may link a business address to multiple flagged accounts, cross-reference those accounts with common phone numbers or email addresses, and trace transactions to identify networks of suspicious activity. By drilling down to these details, the system reduces noise and highlights actionable insights, such as connections between individuals or entities that indicate potential human trafficking or money laundering operations.

The system further enhances this analysis by integrating workflows tailored to tracking complex financial crime networks. The system may align these workflows with the workflows financial institutions use to investigate accounts and transactions, creating a seamless process. This integrated approach enables users to visualize and navigate connections between suspicious accounts, trace illicit funds, and uncover links between trafficking operations and money laundering schemes. By marrying these workflows, the system empowers financial institutions to uncover hidden criminal networks, prioritize high-risk cases, and improve the efficiency and effectiveness of their investigative processes.

As shown in FIG. 1D, user interface 160 may display profiles with correlated data and/or risk scores. For example, user interface 160 indicates address, phone numbers, and other information related to a given entity. The system may further generate one or more recommendations that describe probabilities (e.g., "risk scores") for a given action (e.g., a type of illicit activity).

For example, the system may populate user interface 160 by aggregating and organizing relevant data points—such as addresses, phone numbers, email addresses, and other identifying information—related to a given entity and displaying them in a structured and interactive format. This process begins with the system querying its data sources, which may include internal records, external databases, and real-time data feeds, to gather all associated information about the target entity. Once collected, the system analyzes and categorizes the data, linking it to related entities or transactions to build a comprehensive profile. The user interface 160 then presents this information in a user-friendly format, such as tables, graphs, or network diagrams, allowing users to easily identify connections, trends, or anomalies within the data.

To provide deeper insights, the system employs advanced analytics to generate recommendations based on probabilities or "risk scores" that evaluate the likelihood of a given action or entity being involved in a specific type of illicit activity. These scores are calculated using machine learning models or rule-based algorithms that analyze patterns in the aggregated data. For instance, the system might assess factors such as transaction frequency, geographic anomalies, or links to high-risk entities and assign a risk score that indicates the probability of involvement in activities like money laundering or human trafficking. The recommendations, accompanied by visual indicators like heatmaps or color-coded alerts, guide users to focus on the most critical areas. By combining comprehensive data visualization with actionable risk assessments, the system enables users to make informed decisions and prioritize their investigative efforts effectively.

FIG. 2 shows an illustrative diagram showing the parsing of data elements, in accordance with one or more embodiments. For example, FIG. 2 shows data source 200. Data source 200 may comprise illustrative source code representing a web page. Data source 200 may comprise a plurality of data elements that may be parse. For example, a webpage may be represented as a structured collection of elements defined by source code, primarily written in markup languages like HTML (HyperText Markup Language) and enhanced by technologies such as CSS (Cascading Style Sheets) and JavaScript. The source code serves as the blueprint that browsers use to render and display the webpage to users. HTML forms the backbone of the webpage, organizing content into elements such as headings, paragraphs, links, images, and tables. Each HTML element may be defined by tags, which outline the structure and semantics of the content. CSS may be used alongside HTML to style the webpage, controlling the appearance of elements by defining properties like colors, fonts, spacing, and layout. This separation of content (HTML) and presentation (CSS) ensures flexibility and consistency in design. JavaScript, a scripting language, adds interactivity and dynamic behavior to webpages. It enables features like form validation, animations, data fetching, and real-time updates without requiring the user to reload the page.

When a user accesses a webpage, the browser retrieves the source code and associated files from a server. It then processes the HTML, applies the CSS styles, and executes any JavaScript scripts to construct and display the final webpage. The representation of the webpage in the browser is known as the Document Object Model (DOM), which allows for real-time interaction and manipulation by JavaScript or browser extensions. This layered and modular approach makes webpages both functional and visually appealing.

In the source code of a webpage, images, interactive content, and textual content are represented using specific HTML elements, attributes, and scripts that define their structure and behavior. Textual content is the simplest to represent, typically enclosed within HTML tags like <p> for paragraphs, <h1> to <h6> for headings, <span> for inline text, and <a> for hyperlinks. These tags allow the browser to render text appropriately and make it readable to users.

Images are represented using the <img> tag, which includes attributes like src to specify the image file's location (e.g., a URL or file path) and alt to provide alternative text for accessibility or when the image cannot be displayed. Additional attributes, such as width and height, control the image's dimensions.

Interactive content is often implemented using a combination of HTML, CSS, and JavaScript. For example, buttons and form elements are represented by tags like <button>, <input>, and <form>, with attributes to define their types and functions. JavaScript can then be used to handle events such as clicks, form submissions, or hover effects, enabling interactivity. Complex interactive elements, such as video players or embedded maps, are typically represented using specialized tags like <video> or <iframe>. The <canvas> or <svg> tags can also be used for creating dynamic graphical content, often in conjunction with JavaScript.

By combining these elements, the source code defines the content, attributes, and/or scripts used to present textual content, images, and/or interactive components and defines how they appear and behave. For example, content may be embedded or nested within other content in the source code by organizing elements hierarchically using HTML tags. This nesting structure allows developers to group and arrange content logically and visually. For instance, a <div> (division) tag is commonly used as a container to group related elements, such as text, images, or other containers, creating sections within a webpage. Elements placed inside a <div> are considered "nested" within it.

Text and other content can also be nested within structural or semantic tags. For example, a paragraph <p> might include inline elements like <strong> or <em> to emphasize specific text or <a> tags to create hyperlinks. Similarly, a <ul> (unordered list) or <ol> (ordered list) tag contains multiple <li> (list item) tags, nesting individual list items within the broader list structure. More complex nesting may occur with multimedia and interactive elements. For example, a <figure> tag might contain an <img> tag for an image and a <figcaption> tag for its caption, combining both elements into a single cohesive unit. Interactive components often involve deeply nested structures, such as a <form> element containing various <input> fields, <label> tags, and <button> elements to handle user input. Embedding external content, such as videos or maps, also involves nesting. An <iframe> tag, for instance, can embed another webpage or content source within the current page while maintaining its own nested structure.

The system may parse the source code to identify data elements by analyzing the HTML, CSS, and JavaScript using a structured approach, typically employing a parsing engine or library to interpret the code. The process may begin by fetching the source code of a webpage, either through direct access to the file or via HTTP requests. The system then breaks down the code into its constituent parts, including tags, attributes, and text, and organizes it into a hierarchical representation known as the Document Object Model (DOM). Within the DOM, each HTML element is treated as a node, and its relationships to other nodes—such as parent, child, or sibling elements—are preserved. The system navigates this tree structure to locate specific data elements based on criteria such as tag names, attributes, classes, IDs, or other identifiable patterns. For example, if the goal is to extract all product names from a webpage, the system might search for nodes with specific tags like <h2> or <div> combined with class attributes like product-title. Advanced systems use techniques such as CSS selectors, XPath queries, or regular expressions to pinpoint and extract desired data elements efficiently. For dynamically generated content, the system may also execute JavaScript code embedded in the source, using tools like headless browsers to render the page fully before parsing. Once the relevant data elements are identified, they are extracted and stored in a structured format, such as JSON or a database, for further processing or analysis.

This parsing process enables the system to systematically identify, tag, and/or retrieve data elements (e.g., element 202, element 204, and/or element 206) from complex and dynamically changing webpages, making it a critical step in web scraping, data aggregation, and content analysis. The system may then determine a plurality of data elements in the content source corresponding to a first data encryption and/or obfuscation type, of the plurality of data encryption and/or obfuscation types, wherein the plurality of data elements comprises one or more indicia of the first data encryption and/or obfuscation type.

A system determines a plurality of data elements in a content source corresponding to a first data encryption and/or obfuscation type by analyzing the structure, patterns, and transformations applied to the data in the source. The process begins with parsing the content source to identify potential data elements and examining their representations in the source code. The system searches for specific indicators, or "indicia," of encryption or obfuscation methods, such as unusual encoding patterns, JavaScript functions applied to data elements, or the presence of encrypted strings or hashes.

To detect these indicia, the system may analyze attributes like unusual character sequences, base64-encoded strings, or patterns consistent with hash functions such as SHA-256. It may also monitor the execution of scripts that dynamically transform or encode data at runtime, using tools like headless browsers or JavaScript debuggers to trace these operations. By identifying the transformations applied, the system determines the encryption or obfuscation type and associates it with the corresponding data elements in the content source.

As described herein, a data encryption and/or obfuscation type may comprise a mechanism to prevent data scraping and/or disguise or protect data from automated extraction. Examples of these types may include encryption (e.g., converting data into a ciphered format using algorithms like AES (Advanced Encryption Standard) or RSA, requiring a key to decrypt it back to a readable state), obfuscation (e.g., applying transformations that make the data difficult to interpret, such as encoding it in base64, reversing the string, or injecting meaningless characters or elements to confuse parsers), dynamic generation (e.g., using JavaScript to render data only in the browser, requiring the system to execute the page's code to access the obfuscated content), font-based obfuscation (e.g., replacing text with custom fonts where visible characters are mapped to unrelated glyphs, making the text unreadable when extracted directly), and/or image-based obfuscation (e.g., displaying critical data as images rather than text, preventing direct text extraction).

By determining the encryption and/or obfuscation type and analyzing how it is applied, the system can implement countermeasures, such as decryption algorithms or script execution, to extract and interpret the protected data. For example, the system may determine the encryption or obfuscation type by analyzing the patterns, structures, and transformations applied to data within the content source. This process involves examining the source code, scripts, and data payloads for clues that indicate specific encryption or obfuscation methods. For example, the system may detect base64-encoded strings by identifying patterns like "==" at the end of strings, or it might recognize hashes by their fixed-length hexadecimal or alphanumeric patterns, such as those produced by SHA-256. Similarly, the system may identify obfuscation techniques like reversed strings, interleaved dummy characters, or data dynamically generated through JavaScript.

To understand how these techniques are applied, the system may simulate or monitor the content's runtime behavior. This can involve executing JavaScript within a controlled environment, such as a headless browser, to observe how encrypted or obfuscated data is decoded or manipulated before being displayed to the user. The system may trace script execution paths, inspect function calls, and capture intermediate data states to map the transformation process.

Once the encryption or obfuscation type and its application method are determined, the system implements countermeasures to extract and interpret the protected data. For encryption, the system may use predefined decryption algorithms if the keys or methods are known. For example, if data is encrypted with AES and the key is available, the system applies the AES decryption algorithm to recover the original content. For obfuscated data, the system may reverse the transformation process, such as decoding base64 strings, removing interleaved dummy characters, or executing the same JavaScript functions to restore readable data.

If the system encounters dynamically generated content, it may use script execution tools to simulate the browser's behavior, rendering the content as it would appear to a user. During this process, the system captures and extracts the de-obfuscated data at runtime. These techniques, combined with robust parsing and decoding logic, allow the system to bypass various encryption and obfuscation measures, ensuring that the protected data can be accessed and analyzed for legitimate purposes, such as regulatory compliance, fraud detection, or content aggregation.

FIG. 3 shows illustrative components for a system used to perform a bifurcated data extraction routine, in accordance with one or more embodiments. For example, system 300 shows data source 302, which may be parsed and analyzed by tool 304. For example, using a first routine of a bifurcated data extraction routine, tool 304 may compare data elements (or indicia of the data elements) in data source 302 to data elements (or indicia thereof) corresponding to a plurality of encryption and/or obfuscation types (e.g., known data elements 306) to identify an encryption and/or obfuscation type in data source 302. System 300 may perform multiple iterations to find content nested within multiple encryption and/or obfuscation types.

As shown in FIG. 3, system 300 may include device 310. Device 310 (as well as the other devices and components described herein) may comprise electronic storage. Electronic storage devices are systems designed to electronically store information in various formats and media. These devices may utilize non-transitory storage and/or computer-readable media to retain data and can include both system storage, which is integrally provided within servers or client devices (e.g., substantially non-removable storage), and removable storage that can be connected to servers or client devices through interfaces such as USB ports, Fire Wire ports, or disk drives. Electronic storage media encompass a wide range of technologies, including optically readable storage media like optical disks, magnetically readable storage media such as magnetic tapes, hard drives, and floppy disks, as well as electrical charge-based storage media like EEPROM and RAM. Solid-state storage media, such as flash drives, are another common type of electronic storage. Additionally, virtual storage resources, including cloud storage, virtual private networks (VPNs), and other virtualized systems, are considered part of electronic storage. These devices are capable of storing various forms of data, including software algorithms, information processed or determined by processors, data obtained from servers or client devices, and other essential information that supports the functionality of various processes.

For example, system 300 may perform a bifurcated data extraction routine to efficiently retrieve and process content from data source 302, even when the data is encrypted or obfuscated. In this routine, data source 302 is first retrieved by the system and then parsed and analyzed by tool 304. The bifurcated process begins with a first routine, where tool 304 compares the data elements—or their indicia—present in data source 302 with a repository of known data elements or patterns (e.g., known data elements 306) corresponding to various encryption and obfuscation types. Through this comparison, tool 304 identifies the specific encryption and/or obfuscation type applied to the content in data source 302. This identification process may require multiple iterations, particularly when the content is nested within multiple layers of encryption or obfuscation, with each iteration peeling back a layer to reveal the next.

In some embodiments, system 300 and/or one or more components herein may be implemented using an application-specific integrated circuit. An integrated circuit may be a small electronic device made of semiconductor material, typically silicon, that contains a large number of microscopic electronic components such as transistors, resistors, capacitors, and diodes. These components are interconnected to perform a specific function or set of functions. Integrated circuits can be classified into various types based on their functionality, such as analog, digital, and mixed-signal ICs. The transistors within an IC are the primary building blocks, as they act as switches or amplifiers for electronic signals. The other components, like resistors and capacitors, are used for controlling voltage, current, and timing within the circuit. System 300 may design the integrated circuit to be application specific such that the design of the circuit is customized for a given application. In some embodiments, system 300 may use an integrated circuit system where one or more integrated circuits are spread throughout a system, network, and/or one or more devices. In such a case, the system design may ensure that the circuits are integrated with other electronic components like connectors, power supplies, and sensors to form a complete and functional electronic system. This integration allows for the implementation of sophisticated tasks in devices needed for one or more specified applications.

System 300 may send and/or receive data to device 320, which may generate output 330. System 300 may facilitate the transfer of data between device 310 and device 320, enabling the generation of output 330. Device 310, which functions as a storage device, holds the data that is sent to device 320, such as a CPU. A CPU, or Central Processing Unit, is the primary component of a computer responsible for executing instructions and performing computations necessary for various processes and functions. The CPU may interpret and execute instructions from programs and operating systems through a cycle of fetching, decoding, and executing commands. This cycle begins with the CPU retrieving an instruction from the system's memory, followed by decoding it to understand the required operation and finally executing it by performing arithmetic, logical, control, or input/output tasks. The CPU relies on its internal components, including the arithmetic logic unit (ALU) for mathematical operations, the control unit (CU) for directing data flow, and registers for temporary data storage. By leveraging its clock speed and multiple cores in modern processors, the CPU can execute complex processes efficiently, enabling the functionality of applications and systems.

Device 320 processes the received data by implementing one or more applications and/or models to perform specific tasks or computations. These applications or models analyze, transform, or process the input data to produce the desired output 330. This output may represent the results of calculations, simulations, or other operations conducted by the applications or models on device 320. The system ensures seamless communication between the devices, allowing for efficient data transfer and output generation.

Output 330 may represent the result of processing data or executing instructions. In the case of a CPU, outputs can include processed data, computational results, or responses to input commands. For models, outputs often consist of predictions, classifications, decisions, or other data derived from the model's algorithms or trained parameters. Once generated, the output is typically stored in a suitable storage medium, such as system memory (RAM), a local storage device (e.g., hard drive or SSD), or a networked storage system. This stored output can then be used in various ways depending on the application. For example, it might be displayed to users as visual or textual information, serve as input for subsequent computational tasks, or be transmitted to other devices or systems for further processing. The efficient storage and utilization of outputs are essential for enabling real-time responsiveness, supporting iterative processes, and ensuring seamless integration with larger workflows or systems.

From this, tool 304 may apply a second routine, of the bifurcated data extraction routine, to extract data from data source 302 using an extraction function from a plurality of extraction functions, based on the detected data encryption and/or obfuscation type. The system may then generate for display, on a user interface, the non-encrypted and/or non-obfuscated content that is extracted.

For example, once the encryption and/or obfuscation type is detected, tool 304 proceeds to the second routine of the bifurcated data extraction process. In this step, it applies a targeted extraction function, selected from a library of extraction functions, that is specifically designed to decode or decrypt the identified type. For example, if the data is encoded in base64, the corresponding function will decode it; if it is encrypted using AES, the appropriate decryption algorithm will be applied, provided the key is available. Similarly, for obfuscated data, tool 304 might reverse engineered transformations or execute associated scripts to reconstruct the original content.

After successfully extracting the non-encrypted and/or non-obfuscated content, the system organizes and prepares it for visualization. It then generates a display on a user interface (e.g., user interface 308), presenting the clean and readable content (e.g., content 312) to the user in an accessible format. This bifurcated approach allows system 300 to handle complex, layered encryption and obfuscation scenarios with precision and adaptability, ensuring that the extracted data is both accurate and actionable for downstream applications.

In some embodiments, system 300 may use an I/O (Input/Output) path between devices, which may refer to the communication pathway that facilitates the exchange of data between computing devices or systems. An I/O path may encompass a variety of communication networks such as the Internet, mobile phone networks, mobile voice or data networks like 5G or LTE, cable networks, public switched telephone networks (PSTN), or combinations of these. These networks provide the infrastructure for transmitting data across different mediums. The I/O path can also include specific communication paths, such as satellite links, fiber-optic connections, cable connections, Internet-based communication paths (e.g., IPTV), and free-space links that support wireless or broadcast signals. In addition to external communication networks, computing devices may feature internal communication paths that integrate hardware, software, and firmware components. For example, multiple computing devices can operate as part of a unified cloud-based platform, leveraging interconnected communication paths to function collectively. These I/O paths are essential for ensuring seamless data flow, supporting applications, and enabling distributed computing environments.

In some embodiments, system 300 may be a cloud system. A system structured as a cloud system is designed to provide scalable, on-demand access to computing resources and services over the Internet or other networks. In a cloud system, multiple interconnected servers, data centers, and storage devices work together to deliver virtualized computing power, storage, and applications. These resources are hosted remotely in distributed locations, creating a virtualized environment that can dynamically allocate resources based on user demands. The cloud system is typically organized into three main service models: Infrastructure as a Service (IaaS), which offers virtualized hardware and network resources; Platform as a Service (PaaS), which provides tools and frameworks for application development; and Software as a Service (Saas), which delivers software applications to users. The system relies on communication paths, including high-speed fiber-optic networks, satellite links, and wireless connections, to enable seamless interaction between users and the cloud infrastructure. Advanced management tools and load-balancing mechanisms ensure reliability, efficiency, and fault tolerance within the system.

This structure allows users to access computing resources flexibly and cost-effectively without the need to maintain physical hardware.

In some embodiments, system 300 may use one or more APIs. An API, or Application Programming Interface, is a set of rules and protocols that allows different components within a system, such as system 300, to communicate and interact seamlessly. APIs define how software applications, services, or devices can request and exchange data, enabling interoperability between components regardless of their underlying technologies. Within a system, an API acts as a bridge between different modules, such as databases, user interfaces, or external services, facilitating the flow of information and the execution of commands.

For instance, in system 300, an API might enable device 310, a data storage component, to provide information to device 320, a processing unit. Device 320 could use the API to request specific data, execute operations, or send processed results back to another component. The API specifies the format and structure of the requests and responses, such as using JSON or XML, and enforces security protocols like authentication tokens or encryption to ensure secure communication.

APIs can also enable external systems to interact with system 300. For example, a financial application could use an API to query account balances, initiate transactions, or retrieve fraud detection reports generated by a model housed within the system. By standardizing interactions, APIs simplify the integration of diverse components, improve scalability, and support modular system designs, making it easier to expand or update individual parts without disrupting the entire system.

Figure 4:
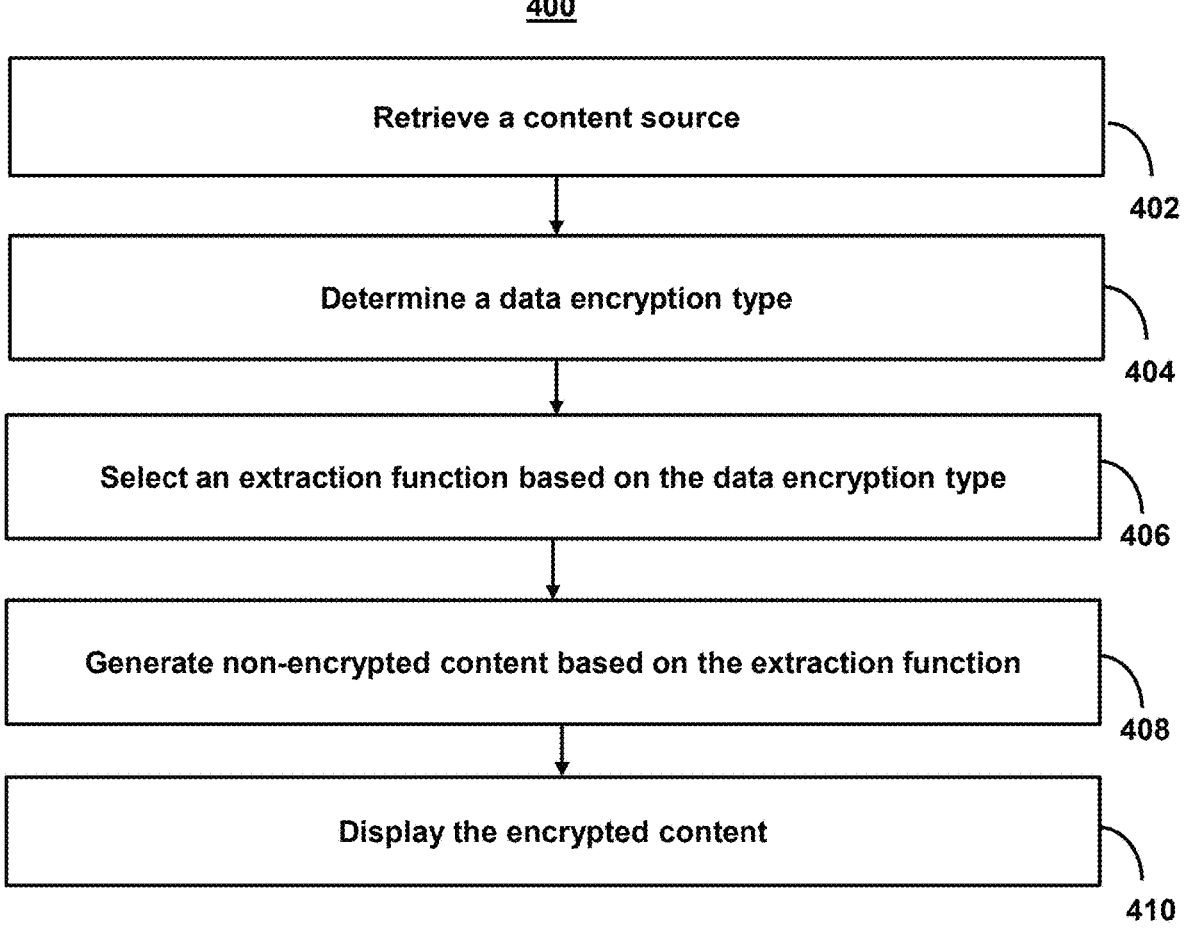
FIG. 4 shows illustrative components for a system used for data collection from encrypted content sources comprising multi-layered encryptions and nested content, in accordance with one or more embodiments.

FIG. 4 shows illustrative components for a system used for data collection from encrypted content sources comprising multi-layered encryptions and nested content, in accordance with one or more embodiments. For example, the system may use process 400 (e.g., as implemented on one or more system components described above) for data scraping encrypted content sources comprising multi-layered encryptions and nested content using bifurcated data extraction routines that include initial analysis and tagging routines prior to dynamically selected extraction routines.

At step 402, process 400 (e.g., using one or more components described above) retrieves a content source. For example, the system may retrieve a first content source, wherein the first content source comprises a plurality of encrypted content masked by one or more of a plurality of data encryption types. The process may begin with the system issuing a request to the content source's endpoint, which may be a website, API, or database. This request is performed using network protocols such as HTTP/HTTPS or database query languages like SQL, depending on the source type.

In some embodiments, the system may retrieve the first content source by initiating a secured session for extracting data from the first content source and recording a first state for the first content source corresponding to the secured session, wherein the first non-encrypted content is archived based on the first state. For example, the system may provide authentication credentials or tokens, ensuring only authorized access to the content source. The secured session is then initiated, and the system records the first state of the content source, which represents its initial structure, data, and metadata at the time of access. Once the secured session is active, the system parses and analyzes the content source to identify and isolate the encrypted and non-encrypted data elements. For encrypted elements, the system applies decryption or decoding methods as needed to retrieve readable content. Simultaneously, the first state of the content source, including the structure, timestamps, and any associated metadata, is archived for reference. This archiving process ensures that the system maintains a snapshot of the content source at the moment of data extraction, which can be used for validation, audit, or historical analysis. The system then extracts the first non-encrypted content based on the first state and organizes it into a structured format suitable for further processing or analysis. By associating the extracted content with the archived first state, the system provides a clear and traceable record of the data in its original context. This method not only ensures secure and accurate data retrieval but also enhances transparency and accountability in handling sensitive or protected information.

In some embodiments, the system may retrieve the first content source by receiving a first user request to begin a secured session and authenticating the secured session based on the first user request. For example, the request may include authentication details such as a username and password, biometric data, or multi-factor authentication tokens. The system validates these credentials against its authentication mechanisms, which may involve checking them against a database, verifying cryptographic tokens, or communicating with an external identity provider.

At step 404, process 400 (e.g., using one or more components described above) determines a data encryption and/or obfuscation type. For example, the system may execute a first routine, of a bifurcated data extraction routine, on the first content source to determine a first data encryption type for first encrypted content in the first content source. During this routine, the system compares the data elements in the content source with a repository of known encryption and/or obfuscation patterns and methods. For instance, the system may recognize base64-encoded strings by their unique syntax (e.g., padding with =), or detect hash values based on their length and character distribution, such as SHA-256 hashes. It may also analyze the source code or scripts embedded in the content source to identify encryption-related functions or algorithms, such as JavaScript code used for client-side encryption or obfuscation. The system may use tools like regular expressions, heuristic analysis, and runtime monitoring to detect transformations applied to the data. For dynamically generated content, the system may execute JavaScript or other embedded scripts within a controlled environment, such as a headless browser, to observe how encrypted data is produced or transformed. Through this analysis, the system identifies the encryption and/or obfuscation type associated with the first encrypted content. By completing the first routine, the system determines the specific data encryption and/or obfuscation type, which is then used to inform the second routine. This step ensures that the appropriate decryption or decoding method can be applied to extract the original content, enabling accurate and efficient data retrieval while maintaining the integrity of the extraction process.

In some embodiments, the system may execute the first routine on the first content source to determine the first data encryption type for the first encrypted content in the first content source by determining a plurality of content subsets at the first content source, iteratively parsing code on each of the plurality of content subsets to extract first encrypted content from the first content source, and determining dependencies between each of the plurality of content subsets based on the first encrypted content. For example, the system executes the first routine on the first content source to determine the first data encryption type for the first encrypted content by systematically analyzing the content through a process of identifying, parsing, and mapping relationships among its subsets. The process begins with the system segmenting the first content source into a plurality of content subsets. These subsets may represent distinct sections of the source, such as individual HTML elements, scripts, or data payloads embedded within the content source. This segmentation is based on structural markers like tags, attributes, or delimiters that define logical boundaries within the source. The system then iteratively parses the code associated with each content subset to isolate and extract encrypted content. During this parsing, it identifies data elements exhibiting characteristics of encryption, such as irregular alphanumeric patterns, fixed-length strings, or encoded formats like base64 or hexadecimal. The system uses tools such as regular expressions, pattern recognition algorithms, and runtime script execution to extract and analyze these data elements. For instance, if a subset contains JavaScript code that generates encrypted content dynamically, the system executes the code in a controlled environment, such as a headless browser, to observe and capture the resulting encrypted output. As each subset is parsed, the system examines the relationships and dependencies between the subsets to understand how the encrypted content is generated or processed. For example, one subset may define a script that applies encryption, while another subset contains the data inputs or keys required for the encryption process. By analyzing these dependencies, the system identifies how the subsets interact to produce or modify the encrypted content. This iterative approach enables the system to pinpoint the specific encryption type used for the first encrypted content. The system cross-references the patterns and transformations observed during parsing with a library of known encryption types, ultimately determining the encryption method. This information is critical for guiding subsequent steps in the bifurcated data extraction routine, where the system applies the appropriate decryption or decoding method to retrieve the original, non-encrypted content. By mapping dependencies and iteratively analyzing subsets, the system ensures a thorough and accurate determination of the encryption type, even for complex or nested content sources.

In some embodiments, the system may execute the first routine on the first content source to determine the first data encryption type for the first encrypted content in the first content source by identifying a plurality of data elements in the first content source, determining one or more data encryption type indicia that correspond to one or more of the plurality of data elements, and comparing the one or more data encryption type indicia to a plurality of data encryption types to determine that the one or more data encryption type indicia correspond to the first data encryption type. For example, the process may begin with the system parsing the first content source to isolate a plurality of data elements. These elements may include strings, script outputs, attributes, or other discrete units of data embedded within the content source. Each data element is extracted and examined for characteristics that suggest the application of an encryption method. Next, the system evaluates these data elements to identify one or more encryption type indicia-distinctive patterns, formats, or behaviors that indicate a specific encryption technique. For instance, the system might detect base64 encoding through the presence of a specific character set and padding (=), or identify hashed data by analyzing the fixed length and hexadecimal structure typical of hash algorithms like SHA-256. Similarly, encrypted text generated by algorithms like AES or RSA may exhibit random-ized, unreadable patterns with no discernible semantic meaning. Once the encryption type indicia are identified, the system compares these indicators to a library of known data encryption types. This library may include predefined patterns, transformation rules, or metadata associated with common encryption methods. The comparison process involves matching the observed indicia against these references to determine which encryption type corresponds to the identified patterns. For example, if the indicia include a specific data format and the presence of an initialization vector in a script, the system might conclude that the encryption type is AES-CBC (Cipher Block Chaining). By completing this process, the system determines that the one or more data encryption type indicia correspond to the first data encryption type. This identification allows the system to prepare for the next step in the bifurcated data extraction routine, where it applies the appropriate decryption or decoding function to extract the non-encrypted content. This method ensures precise identification of encryption types, enabling the system to handle diverse and complex encryption scenarios effectively.

In some embodiments, the system may execute the first routine on the first content source to determine the first data encryption type for the first encrypted content in the first content source by determining a first location of the first data encryption type and determining a first encryption mapping of the first content source based on determining that the first location corresponds to the first data encryption type. For example, the process may begin with the system analyzing the structure and components of the first content source, such as scripts, metadata, and embedded data elements. During this analysis, the system identifies the first location associated with the encryption type, which could include specific sections of code, script files, or data attributes where encryption operations are defined or applied. To pinpoint the first location, the system searches for markers or patterns indicative of encryption. These may include function names (e.g., "encrypt," "encode"), variable names linked to encryption keys or algorithms, or the presence of cryptographic libraries (e.g., AES, RSA, or Base64 encoders). For instance, JavaScript code may include functions that process data through encryption logic, or API responses may include metadata specifying the encryption scheme used. The system may execute or simulate the source's runtime behavior in a controlled environment to trace the flow of data and observe where and how encryption is applied. Once the first location is determined, the system constructs a first encryption mapping of the content source. This mapping outlines how the encryption type is implemented and applied across the source, including which data elements are encrypted, the encryption parameters (e.g., keys, initialization vectors), and the relationships between encrypted and unencrypted data. The mapping also establishes the scope and dependencies of the encryption type within the content source, highlighting connections between different parts of the source where encryption operations occur. By determining that the first location corresponds to the first data encryption type and creating the encryption mapping, the system gains a comprehensive understanding of how the encryption type operates within the content source. This mapping is essential for guiding subsequent steps in the data extraction process, enabling the system to accurately apply the appropriate decryption or decoding functions to retrieve the original, non-encrypted content. The method ensures precision and efficiency in handling encrypted content, even in complex or layered scenarios.

In some embodiments, the system may execute the first routine on the first content source to determine the first data encryption type for the first encrypted content in the first content source by determining a series of operations to perform on a plurality of text strings of the nested attribute and extracting a first text string of the plurality of text strings based on the series of operations. For example, the process may begin with the system parsing the content source to locate encrypted or obfuscated data within attributes, such as those found in HTML tags, JSON objects, or API responses. These attributes may contain nested structures where multiple layers of transformations or encodings are applied to the data. To process these nested attributes, the system identifies a series of operations that have been performed on the plurality of text strings contained within the attributes. This involves examining the structure and content of the attributes for patterns or scripts that indicate how the text strings have been transformed. For example, the system may detect base64 encoding, string reversals, or obfuscation through interleaved characters. Additionally, it may analyze associated scripts or functions in the source code to trace how data is manipulated before being displayed or transmitted. The system determines the sequence of operations by either static code analysis (reviewing the source code for transformation functions) or dynamic execution (observing how the text strings are processed at runtime). For example, if a JavaScript function decrypts a string after reversing it, the system records the sequence as "reverse→decrypt." Once the series of operations is identified, the system applies them in reverse order to extract a first text string from the plurality of text strings in the nested attribute. By sequentially undoing each transformation, the system reconstructs the original, non-encrypted, or non-obfuscated text string. This extracted text string is then analyzed further to confirm the encryption type, such as by comparing its characteristics to known encryption patterns or verifying its integrity against expected results. Through this method, the system accurately determines the first data encryption type applied to the first encrypted content, enabling it to proceed with the next steps of data extraction and decryption. This approach is particularly effective for handling complex, nested attributes where multiple transformations obscure the underlying data.

In some embodiments, the first data encryption type may comprise an image, and wherein applying the first extraction function to the first encrypted by determining text data in the image and extracting the text data from the image. For example, the system processes a first data encryption type that comprises an image by using optical character recognition (OCR) or similar text extraction techniques to identify and retrieve text data embedded within the image. This method is necessary when encrypted data or obfuscated information is represented visually rather than in standard text or encoded formats, making it inaccessible to traditional text-based parsing and decryption tools. The process may begin with the system identifying the image containing the encrypted data. This identification may involve analyzing the content source for image files linked to relevant data, such as images embedded in HTML, delivered via API responses, or stored as attachments. Once the image is retrieved, the system applies an extraction function specifically designed for image processing. The extraction function uses OCR technology to analyze the visual elements of the image and detect text characters. This involves breaking the image into pixel-level data, identifying regions of interest where text might be located, and interpreting the shapes and patterns of the characters. The OCR process can handle various text styles, fonts, and sizes and may include pre-processing steps like noise reduction, contrast adjustment, and image scaling to improve accuracy. Once the text data is identified, the system extracts it into a machine-readable format, such as a plain text string. If the extracted text data is itself encrypted or obfuscated, the system then applies additional processing routines, such as decoding or decrypting the text using the appropriate algorithms, based on the identified encryption type. For example, the extracted text might include a base64-encoded string or a hashed value, which the system can process further to retrieve the original content. By determining text data in the image and extracting it, the system effectively bridges the gap between visual data representation and text-based decryption processes. This approach ensures that encrypted or obfuscated data embedded in images can be accessed, analyzed, and integrated into the broader data extraction workflow, enabling a comprehensive analysis of complex content sources.

In some embodiments, the first data encryption type comprises a style element of the first encrypted content, and wherein applying the first extraction function to the first encrypted content comprises determining metadata corresponding to the style element, formatting the metadata into a data variable, and extracting the data variable. For example, the system may process a first data encryption type that comprises a style element of the first encrypted content by analyzing the metadata associated with the style element, transforming it into a structured format, and extracting meaningful data from it. This method is particularly useful when encrypted or obfuscated data is embedded within styling information, such as CSS (Cascading Style Sheets) attributes, inline styles, or dynamically applied styles. The process may begin with the system identifying the style element associated with the encrypted content. This may involve parsing the content source to locate relevant <style> tags, inline style attributes in HTML elements, or linked external CSS files. The system analyzes these style elements to identify metadata that may hold obfuscated data, such as custom font mappings, color codes, positioning attributes, or encoded data embedded within style rules. Next, the system retrieves the metadata corresponding to the style element and formats it into a structured data variable. For example, if the style element uses a custom font to display obfuscated characters, the system analyzes the font's metadata to map each glyph back to its corresponding character. Similarly, if the style contains encoded values (e.g., color codes or numerical offsets), the system applies transformations to decode or interpret these values as structured data. Once the metadata is formatted into a usable data variable, the system extracts the variable for further processing. This may involve applying additional decoding or decryption steps if the extracted data variable is still encrypted or obfuscated. For instance, if the style metadata encodes text using a transformation function, the system reverses the transformation to retrieve the original content. By processing the style element in this manner, the system effectively uncovers encrypted or obfuscated data hidden within visual or design-oriented components of the content source. This approach ensures that all potential data storage mechanisms, including unconventional ones like style metadata, are thoroughly analyzed and incorporated into the overall data extraction workflow, enabling comprehensive and accurate retrieval of the first encrypted content.

At step 406, process 400 (e.g., using one or more components described above) selects an extraction function based on the data encryption type. For example, the system may execute a second routine, of the bifurcated data extrac-tion routine, to select a first extraction function from a plurality of extraction functions based on the first data encryption type. The process may begin with the completion of the first routine, where the system determines the encryption type applied to the encrypted content. The identified encryption type is then used as a key criterion to match the appropriate extraction function from the system's library of functions. The system may maintain a repository of extraction functions, each designed to handle specific encryption or obfuscation methods. These functions include algorithms for decryption (e.g., AES, RSA), decoding (e.g., base64, URL encoding), and other transformation reversals (e.g., reversing strings, removing interleaved characters). Each function is associated with metadata that describes the encryption type it can process, input parameters it requires, and any dependencies or prerequisites for execution. Using the first data encryption type as a reference, the system queries the repository to identify the extraction function that corresponds to the encryption method. For example, if the first data encryption type is determined to be base64 encoding, the system selects the base64 decoding function. If it is AES encryption, the system selects the AES decryption function and ensures that the necessary decryption key and initialization vector (IV) are available. Once the appropriate extraction function is selected, the system configures it with the required parameters, such as the encrypted content, keys, or additional contextual information obtained during the first routine. The configured function is then executed to extract the original, non-encrypted content from the first encrypted content. This methodical selection process ensures that the system applies the correct and most effective function to handle the identified encryption type, enabling accurate and efficient data extraction. By maintaining a robust library of extraction functions and aligning their application with the specific encryption type, the system effectively processes diverse and complex encrypted content sources.

At step 408, process 400 (e.g., using one or more components described above) generates non-encrypted content based on the extraction function. For example, the system may generate the first non-encrypted content based on applying the first extraction function to the first encrypted content. The system may generate the first non-encrypted and/or non-obfuscated content by applying the first extraction function to the encrypted and/or obfuscated content, effectively reversing the transformations that conceal the original data. The process begins with the system retrieving the encrypted or obfuscated content, which may have been identified and isolated during earlier routines. The system then applies the selected extraction function, configured to handle the specific encryption or obfuscation type identified. For encrypted content, the extraction function uses the appropriate decryption algorithm and necessary keys to decode the data. For instance, if the content is encrypted using AES, the function applies the AES decryption algorithm along with the decryption key and initialization vector (IV) to recover the original plaintext. If the encryption involves asymmetric methods, such as RSA, the function uses the corresponding private key for decryption. For obfuscated content, the extraction function reverses the obfuscation process. This could involve decoding base64-encoded strings, reversing scrambled characters, removing interleaved dummy data, or executing JavaScript functions that dynamically generate the original content. In cases where multiple layers of obfuscation are applied, the function iteratively processes each layer until the underlying content is fully revealed. Once the extraction function completes its operation, the system validates the output to ensure that the generated content matches the expected format or integrity of the original data. This may involve checksum verification, pattern matching, or semantic checks to confirm the content's authenticity and accuracy. The resulting non-encrypted and/or non-obfuscated content is then structured and formatted for further use, such as displaying it on a user interface, integrating it into a database, or using it for analytical purposes. By effectively applying the extraction function to reverse encryption and/or obfuscation, the system transforms inaccessible or concealed data into readable and actionable information, supporting the broader objectives of data aggregation, analysis, or monitoring.

In some embodiments, the system may generate the first non-encrypted and/or non-obfuscated content based on applying the first extraction function to the first encrypted content by receiving a first data output from the first extraction function and formatting the first data output into a tabular representation to generate the first non-encrypted content. After the first extraction function processes the encrypted and/or obfuscated content, it produces a first data output, which typically consists of the raw, decrypted, or de-obfuscated information. This output may initially be unstructured or semi-structured, depending on the encryption or obfuscation method used and the nature of the content. To transform this raw data into the first non-encrypted and/or non-obfuscated content, the system processes the data output to organize it into a tabular format. This involves parsing the output to extract relevant fields or attributes and mapping them to predefined columns in the table. For instance, if the decrypted data includes information about transactions, the system might extract fields such as "Transaction ID," "Date," "Amount," and "Recipient" and assign them to corresponding columns. Similarly, if the data pertains to user profiles, attributes like "Name," "Email," "Phone Number," and "Address" might populate the table. The system ensures that the tabular representation maintains consistency, readability, and usability. It may apply additional formatting, such as standardizing date formats, aligning numerical values, or categorizing data into groups for easier interpretation. Validation checks are performed during this step to ensure the extracted data aligns with expected formats or schema requirements. Once the tabular representation is generated, it becomes the final form of the first non-encrypted content. This structured format is highly useful for visualization, reporting, or integration into databases or analytical tools. By formatting the extracted data into a table, the system provides a clear and accessible view of the decrypted content, facilitating seamless downstream processing and decision-making.

In some embodiments, the system may generate the first non-encrypted content based on applying the first extraction function to the first encrypted content by receiving a first data output from the first extraction function, wherein the first data output comprises an address and formatting the first data output, using an address cleansing algorithm, to populate a standardized address field with the address. For example, the system may generate first non-encrypted and/or non-obfuscated content by applying a first extraction function to the encrypted and/or obfuscated content, receiving the resulting data output, and using an address cleansing algorithm to standardize and format the extracted address. After the first extraction function processes the encrypted or obfuscated content, it produces a first data output, which may include raw or partially structured data such as an address. This address may not initially conform to standard formats due to inconsistencies, variations, or incomplete components in the original data. To ensure the address is usable and accurate, the system applies an address cleansing algorithm. This algorithm processes the extracted address by verifying its components, correcting errors, and structuring it into a standardized format. For example, the algorithm may normalize street abbreviations ("St." to "Street"), correct misspellings, complete missing components (e.g., city, state, or ZIP code) using context or reference databases, and remove extraneous characters. The algorithm may also validate the address against official postal or geographical databases to ensure its accuracy and completeness. Once cleansed and validated, the system formats the address to populate a standardized address field. This involves mapping the address components-such as street name, building number, city, state, and ZIP code-into designated fields within a structured schema. The standardized address field ensures consistency, making it easier to use the data for downstream processes like matching, analysis, or integration into other systems. This approach enables the system to transform raw, extracted address data into a reliable and uniform format, facilitating accurate reporting, analysis, and operational use. By combining data extraction with address cleansing, the system ensures the first non-encrypted and/or non-obfuscated content is both precise and ready for practical application.

In some embodiments, the system may generate the first non-encrypted content based on applying the first extraction function to the first encrypted content by receiving a first data output from the first extraction function, wherein the first data output comprises pixel width metadata, and determining a numeric score based on the pixel width metadata. For example, the system may generate the first non-encrypted and/or non-obfuscated content by applying the first extraction function to the encrypted content, receiving the resulting data output, and analyzing specific metadata, such as pixel width metadata, to derive a numeric score. After the system applies the first extraction function to the encrypted content, it produces a first data output that includes pixel width metadata. This metadata typically pertains to visual or graphical elements, such as text rendered with custom fonts, images, or user interface components, and provides details about the pixel width of these elements. The system processes the pixel width metadata to interpret its significance and extract meaningful information. For instance, pixel width may correspond to the dimensions of rendered text characters, which could be encoded in the visual presentation as part of an obfuscation scheme. The system uses the pixel width values to calculate a numeric score, applying a predefined algorithm or heuristic that translates the metadata into a quantitative representation. This algorithm might involve summing pixel widths, applying weights to specific ranges, or analyzing patterns in the metadata to detect encoded information. The resulting numeric score is then used to populate a structured field in the first non-encrypted and/or non-obfuscated content. For example, the score might represent the importance, frequency, or categorization of the associated data. This approach is particularly useful in scenarios where obfuscation techniques leverage visual properties, such as custom font mappings or spacing-based encoding. By analyzing pixel width metadata and deriving a numeric score, the system converts visual or metadata-based information into actionable, non-obfuscated content. This enables downstream applications, such as content analysis, categorization, or pattern recognition, to utilize the derived information effectively.

In some embodiments, the system may generate the first non-encrypted content based on applying the first extraction function to the first encrypted content by receiving a first data output from the first extraction function, wherein the first data output comprises a first date format, and reformatting the first data output to a second date format. For example, the system may generate the first non-encrypted and/or non-obfuscated content by applying the first extraction function to the first encrypted content, receiving the resulting data output, and reformatting the extracted data into a standardized format. When the first extraction function processes the encrypted content, it produces a first data output that may include a date in a specific format, such as "MM/DD/YYYY" or "YYYY-MM-DD." However, to ensure consistency and compatibility across systems, the system reformats this date into a second date format, such as "DD-MM-YYYY" or another format required by downstream applications. The reformatting process may begin with the system parsing the extracted date to identify its components, including the day, month, and year. The system then uses predefined rules or date transformation algorithms to rearrange these components into the desired format. For example, if the original date is in the "MM/DD/YYYY" format, and the target format is "YYYY-MM-DD," the system extracts the month, day, and year values and reorders them accordingly, ensuring the separators are adjusted to match the second format. During this process, the system may also validate the date to ensure its accuracy and handle edge cases, such as invalid dates or ambiguous formats. For instance, it might cross-check the extracted date against a calendar to confirm its validity or account for locale-specific differences in date representations. Once the date is reformatted into the second format, it is integrated into the structured, non-encrypted, and non-obfuscated content, ready for use in reporting, analysis, or storage. This reformatting ensures that the extracted data adheres to consistent standards, enhancing its usability and interoperability across various systems and workflows.

In some embodiments, the system may generate the first non-encrypted content based on applying the first extraction function to the first encrypted content by receiving a first data output from the first extraction function, wherein the first data output comprises a longitude or a latitude, and determining a geospatial coordinate based on the longitude or the latitude. For example, the system may generate the first non-encrypted and/or non-obfuscated content by applying the first extraction function to the first encrypted content, extracting geospatial data such as a longitude or latitude, and combining or validating this data to determine a geospatial coordinate. When the first extraction function processes the encrypted content, it outputs a first data set that includes either longitude, latitude, or both. These values may initially be in an isolated or partial form, requiring further processing to create a complete and usable geospatial coordinate. The system begins by parsing the extracted longitude and latitude values, ensuring they are valid numerical representations within their respective ranges. Longitude values are checked to fall between −180° and +180°, while latitude values must fall between −90° and +90°. If only one value is present (e.g., longitude), the system may reference additional data sources or contextual metadata to retrieve the missing counterpart, ensuring the complete coordinate is formed. Once both longitude and latitude values are available and validated, the system combines them into a geospatial coordinate, typically represented in formats such as decimal degrees (e.g., 37.7749, −122.4194). The system may also enrich the coordinate by associating it with additional geospatial metadata, such as a place name, address, or region, using reverse geocoding APIs or databases. This step adds contextual information that enhances the usability of the geospatial coordinate. The final geospatial coordinate is then structured into the non-encrypted and non-obfuscated content, ready for visualization, mapping, or integration into location-based systems. By processing longitude and latitude values into a standardized and actionable geospatial coordinate, the system ensures the extracted data is accurate, meaningful, and applicable for downstream applications like geospatial analysis or navigation.

At step 410, process 400 (e.g., using one or more components described above) displays the encrypted content. For example, the system may generate for display, on a user interface, the first non-encrypted content. The system may generate the first non-encrypted content for display on a user interface by transforming the extracted data into a visually organized, interactive, and user-friendly format. After the content is decrypted or de-obfuscated using the first extraction function, the system processes and structures the resulting data into a form suitable for presentation. This preparation involves formatting, organizing, and enriching the data to ensure it is both readable and actionable. The system begins by categorizing the extracted content based on its type, such as text, numerical data, images, or geospatial coordinates. Each data type is formatted appropriately: text may be styled with headings or labels, numerical data may be formatted with appropriate units or precision, and geospatial data may be plotted on a map. The system may also apply additional processing, such as summarizing large datasets into tables or charts or grouping related data into logical sections. Once formatted, the data is integrated into the user interface. The system generates user interface components such as tables, charts, lists, or maps to present the content in an intuitive manner. Interactive elements, such as filters, drop-down menus, or clickable items, may be included to allow users to explore and manipulate the data directly. For example, if the content includes transaction data, the system might display it in a sortable table with columns for transaction ID, amount, and date. The system also ensures that the user interface is responsive and adaptable to different devices and screen sizes, providing a seamless experience for users accessing the content on desktops, tablets, or mobile devices. Accessibility features, such as screen reader support or high-contrast modes, may be incorporated to enhance usability for all users. Finally, the system populates the user interface with the processed data and renders it for display, enabling users to view, analyze, and act on the first non-encrypted content in real time. By leveraging thoughtful design and robust data processing, the system ensures that the extracted content is presented clearly and effectively to support user workflows and decision-making.

In some embodiments, the system may generate for display the first non-encrypted content by parsing the first non-encrypted content for a plurality of data elements that correspond to encrypted content and determining whether to process the first non-encrypted content with the bifurcated data extraction routine based on the plurality of data elements. For example, the system may generate for display the first non-encrypted content by parsing it to identify a plurality of data elements that correspond to potentially encrypted or obfuscated content, and then determining whether additional processing with the bifurcated data extraction routine is required. Once the first non-encrypted content is extracted using the initial decryption or de-obfuscation process, the system analyzes this content to ensure that all relevant information has been fully resolved and is ready for display. The system begins by parsing the first non-encrypted content to identify data elements that may still indicate traces of encryption or obfuscation. These elements could include patterns such as partially decoded strings, nested encoded data, or anomalies like inconsistent formats or unreadable characters. During this step, the system applies pattern recognition techniques, regular expressions, or heuristics to detect such elements and flag them for further analysis. If the system identifies a plurality of data elements corresponding to encrypted or obfuscated content, it evaluates whether the remaining content requires additional processing using the bifurcated data extraction routine. This determination is based on criteria such as the presence of known encryption or obfuscation indicators, dependencies on nested content, or incomplete data fields that suggest further decryption or decoding is needed. If additional processing is necessary, the system dynamically reapplies the bifurcated data extraction routine to the flagged data elements. The first routine identifies the encryption or obfuscation type applied to the remaining content, while the second routine applies the appropriate extraction function to resolve it fully. Once this iterative process is complete, the updated non-encrypted content is validated to ensure completeness and accuracy. Finally, the system formats the fully resolved content into a structured and visually coherent representation for display on the user interface. By dynamically assessing and reprocessing the first non-encrypted content, the system ensures that all data elements are accurately extracted and presented, enabling users to interact with clear and actionable information.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for data scraping and/or data collection of encrypted and/or obfuscated content sources.
2. The method of the previous embodiment, further comprising: retrieving a first content source, wherein the first content source comprises a plurality of encrypted content masked by one or more of a plurality of data encryption types; executing a first routine, of a bifurcated data extraction routine, on the first content source to determine a first data encryption type for first encrypted content in the first content source; executing a second routine, of the bifurcated data extraction routine, to select a first extraction function, from a plurality of extraction functions, based on the first data encryption type; generating first non-encrypted content based on applying the first extraction function to the first encrypted content; and generating for display, on a user interface, the first non-encrypted content.
3. The method of any one of the preceding embodiments, wherein retrieving the first content source further comprises: initiating a secured session for extracting data from the first content source; and recording a first state for the first content source corresponding to the secured session, wherein the first non-encrypted content is archived based on the first state.
4. The method of any one of the preceding embodiments, wherein retrieving the first content source further comprises: receiving a first user request to begin a secured session; and authenticating the secured session based on the first user request.
5. The method of any one of the preceding embodiments, wherein executing the first routine on the first content source to determine the first data encryption type for the first encrypted content in the first content source further comprises: determining a plurality of content subsets at the first content source; iteratively parsing code on each of the plurality of content subsets to extract first encrypted content from the first content source; and determining dependencies between each of the plurality of content subsets based on the first encrypted content.
6. The method of any one of the preceding embodiments, wherein executing the first routine on the first content source to determine the first data encryption type for the first encrypted content in the first content source further comprises: identifying a plurality of data elements in the first content source; determining one or more data encryption type indicia that correspond to one or more of the plurality of data elements; and comparing the one or more data encryption type indicia to a plurality of data encryption types to determine that the one or more data encryption type indicia correspond to the first data encryption type.
7. The method of any one of the preceding embodiments, wherein executing the first routine on the first content source to determine the first data encryption type for the first encrypted content in the first content source further comprises: determining a first location of the first data encryption type; and determining a first encryption mapping of the first content source based on determining that the first location corresponds to the first data encryption type.
8. The method of any one of the preceding embodiments, wherein the first data encryption type comprises a nested attribute, and wherein applying the first extraction function to the first encrypted content comprises: determining a series of operations to perform on a plurality of text strings of the nested attribute; and extracting a first text string of the plurality of text strings based on the series of operations.
9. The method of any one of the preceding embodiments, wherein the first data encryption type comprises an image, and wherein applying the first extraction function to the first encrypted content comprises: determining text data in the image; and extracting the text data from the image.
10. The method of any one of the preceding embodiments, wherein the first data encryption type comprises a style element of the first encrypted content, and wherein applying the first extraction function to the first encrypted content comprises: determining metadata corresponding to the style element; formatting the metadata into a data variable; and extracting the data variable.

11. The method of any one of the preceding embodiments, wherein generating the first non-encrypted content based on applying the first extraction function to the first encrypted content further comprises: receiving a first data output from the first extraction function; and formatting the first data output into a tabular representation to generate the first non-encrypted content.

12. The method of any one of the preceding embodiments, wherein generating the first non-encrypted content based on applying the first extraction function to the first encrypted content further comprises: receiving a first data output from the first extraction function, wherein the first data output comprises an address; and formatting the first data output, using an address cleansing algorithm, to populate a standardized address field with the address.

13. The method of any one of the preceding embodiments, wherein generating the first non-encrypted content based on applying the first extraction function to the first encrypted content further comprises: receiving a first data output from the first extraction function, wherein the first data output comprises pixel width metadata; and determining a numeric score based on the pixel width metadata.

14. The method of any one of the preceding embodiments, wherein generating the first non-encrypted content based on applying the first extraction function to the first encrypted content further comprises: receiving a first data output from the first extraction function, wherein the first data output comprises a first date format; and reformatting the first data output to a second date format.

15. The method of any one of the preceding embodiments, wherein generating the first non-encrypted content based on applying the first extraction function to the first encrypted content further comprises: receiving a first data output from the first extraction function, wherein the first data output comprises a longitude or a latitude; and determining a geospatial coordinate based on the longitude or the latitude.

16. The method of any one of the preceding embodiments, wherein generating for display the first non-encrypted content further comprises: parsing the first non-encrypted content for a plurality of data elements that correspond to encrypted content; and determining whether to process the first non-encrypted content with the bifurcated data extraction routine based on the plurality of data elements.

17. One or more non-transitory, computer-readable mediums storing instructions that, when executed by a data processing apparatus, cause the data processing apparatus to perform operations comprising those of any of embodiments 1-16.

18. A system comprising one or more processors; and memory storing instructions that, when executed by the processors, cause the processors to effectuate operations comprising those of any of embodiments 1-16.

19. A system comprising means for performing any of embodiments 1-16.

What is claimed is:

1. A system for data scraping encrypted content sources comprising multi-layered encryptions and nested content using bifurcated data extraction routines that include initial analysis and tagging routines prior to dynamically selected extraction routines, the system comprising:

one or more processors; and one or more non-transitory, computer-readable mediums comprising instructions that when executed by the one or more processors cause operations comprising:

receiving a first user request to begin a secured session;

authenticating the secured session;

in response to authenticating the secured session, retrieving a first content source, wherein the first content source comprises a plurality of encrypted content masked by one or more of a plurality of data encryption types;

executing a first routine, of a bifurcated data extraction routine, on the first content source by:

determining a plurality of data elements in the first content source corresponding to a first data encryption type, of the plurality of data encryption types, for first encrypted content, wherein the plurality of data elements comprises one or more indicia of the first data encryption type; and determining a first encryption mapping of the first content source, wherein the first encryption mapping comprises a first location of the first data encryption type;

in response to executing the first routine, executing a second routine, of the bifurcated data extraction routine, on the first content source to generate first non-encrypted content:

selecting a first extraction function, from a plurality of extraction functions, based on the first data encryption type determined by the first routine; and applying the first extraction function to the first location; and generating for display, on a user interface, the first non-encrypted content during the secured session.

2. A method for data collection from encrypted content sources comprising multi-layered encryptions and nested content, the method comprising:

retrieving a first content source, wherein the first content source comprises a plurality of encrypted content masked by one or more of a plurality of data encryption types;

executing a first routine, of a bifurcated data extraction routine, on the first content source to determine a first data encryption type for first encrypted content in the first content source;

in response to executing the first routine, executing a second routine, of the bifurcated data extraction routine, to select a first extraction function, from a plurality of extraction functions, based on the first data encryption type determined by the first routine;

generating first non-encrypted content based on applying the first extraction function to the first encrypted content; and generating for display, on a user interface, the first non-encrypted content.

3. The method of claim 2, wherein retrieving the first content source further comprises:

initiating a secured session for extracting data from the first content source; and recording a first state for the first content source corresponding to the secured session, wherein the first non-encrypted content is archived based on the first state.

4. The method of claim 2, wherein retrieving the first content source further comprises:

receiving a first user request to begin a secured session; and authenticating the secured session based on the first user request.

5. The method of claim 2, wherein executing the first routine on the first content source to determine the first data encryption type for the first encrypted content in the first content source further comprises:

determining a plurality of content subsets at the first content source;

iteratively parsing code on each of the plurality of content subsets to extract first encrypted content from the first content source; and determining dependencies between each of the plurality of content subsets based on the first encrypted content.

6. The method of claim 2, wherein executing the first routine on the first content source to determine the first data encryption type for the first encrypted content in the first content source further comprises:

identifying a plurality of data elements in the first content source;

determining one or more data encryption type indicia correspond to one or more of the plurality of data elements; and comparing the one or more data encryption type indicia to a plurality of data encryption types to determining that the one or more data encryption type indicia correspond to the first data encryption type.

7. The method of claim 2, wherein executing the first routine on the first content source to determine the first data encryption type for the first encrypted content in the first content source further comprises:

determining a first location of the first data encryption type; and determining a first encryption mapping of the first content source based on determining that the first location corresponds to the first data encryption type.

8. The method of claim 2, wherein the first data encryption type comprises a nested attribute, and wherein applying the first extraction function to the first encrypted content comprises:

determining a series of operations to perform on a plurality of text strings of the nested attribute; and extracting a first text string of the plurality of text strings based on the series of operations.

9. The method of claim 2, wherein the first data encryption type comprises an image, and wherein applying the first extraction function to the first encrypted content comprises:

determining text data in the image; and extracting the text data from the image.

10. The method of claim 2, wherein the first data encryption type comprises a style element of the first encrypted content, and wherein applying the first extraction function to the first encrypted content comprises:

determining metadata corresponding to the style element;

formatting the metadata into a data variable; and extracting the data variable.

11. The method of claim 2, wherein generating the first non-encrypted content based on applying the first extraction function to the first encrypted content further comprises:

receiving a first data output from the first extraction function; and formatting the first data output into a tabular representation to generate the first non-encrypted content.

12. The method of claim 2, wherein generating the first non-encrypted content based on applying the first extraction function to the first encrypted content further comprises:

receiving a first data output from the first extraction function, wherein the first data output comprises an address; and formatting the first data output, using an address cleansing algorithm, to populate a standardized address field with the address.

13. The method of claim 2, wherein generating the first non-encrypted content based on applying the first extraction function to the first encrypted content further comprises:

receiving a first data output from the first extraction function, wherein the first data output comprises pixel width metadata; and determining a numeric score based on the pixel width metadata.

14. The method of claim 2, wherein generating the first non-encrypted content based on applying the first extraction function to the first encrypted content further comprises:

receiving a first data output from the first extraction function, wherein the first data output comprises a first date format; and reformatting the first data output to a second date format.

15. The method of claim 2, wherein generating the first non-encrypted content based on applying the first extraction function to the first encrypted content further comprises:

receiving a first data output from the first extraction function, wherein the first data output comprises a longitude or a latitude; and determining a geospatial coordinate based on the longitude or the latitude.

16. The method of claim 2, wherein generating for display the first non-encrypted content further comprises:

parsing the first non-encrypted content for a plurality of data elements that correspond to encrypted content; and determining whether to process the first non-encrypted content with the bifurcated data extraction routine based on the plurality of data elements.

17. The method of claim 2, wherein executing the first routine on the first content source to determine the first data encryption type for the first encrypted content in the first content source further comprises:

retrieving the first content source, wherein the first content source comprises a plurality of obfuscated content masked by one or more of a plurality of data obfuscation types;

parsing the first content source for the plurality of obfuscated content;

determining a first data obfuscation type for first obfuscated content in the first content source;

selecting a first extraction function, from a plurality of extraction functions, based on the first data obfuscation type; and generating first non-obfuscated content based on applying the first extraction function to the first obfuscated content.

18. The method of claim 17, wherein generating the first non-obfuscated content based on applying the first extraction function to the first obfuscated content further comprises:

determining a series of operations to perform on a plurality of text strings of a nested attribute; and extracting a first text string of the plurality of text strings based on the series of operations.

19. The method of claim 17, wherein generating the first non-obfuscated content based on applying the first extraction function to the first obfuscated content further comprises:

determining text data in an image; and extracting the text data from the image.

20. The method of claim 17, wherein generating the first non-obfuscated content based on applying the first extraction function to the first obfuscated content further comprises:

determining metadata corresponding to a style element;

formatting the metadata into a data variable; and extracting the data variable.

\* \* \* \* \*